United States Patent

Boggs

[15] 3,678,123

[45] May 18, 1972

[54] TERTIARY ALKYLATION UTILIZING AN ADMIXTURE OF OLEFINS AND TERTIARY ALKYL CHLORIDES

[72] Inventor: Jesse K. Boggs, Houston, Tex.

[73] Assignee: Esso Research and Engineering Company

[22] Filed: Dec. 28, 1970

[21] Appl. No.: 102,093

[52] U.S. Cl. .................... 260/671 R, 260/671 B, 260/671 P
[51] Int. Cl. .......................................................... C07c 3/56
[58] Field of Search ............. 260/671 R, 671 B, 671 G, 671 P

[56] References Cited

UNITED STATES PATENTS 2,816,940  12/1957  Schlatter ........................... 260/671 R
2,880,250  3/1959  Myerson et al. ..................... 260/671 B

*Primary Examiner*—Curtis R. Davis
*Attorney*—Thomas B. McCulloch, Melvin F. Fincke, John S. Schneider, Sylvester W. Brock, Jr. and Timothy L. Burgess

[57] ABSTRACT

Benzene or naphthalene is selectively tertiary alkylated by reaction with $C_7$ to $C_{44}$ tertiary alkyl chlorides in admixture with tertiary olefins similar to those from which the tertiary alkyl chlorides are derived, in the presence of a Friedel-Crafts catalyst and under reaction conditions including a temperature from −20° C. to 30° C., a pressure of from 5 to 400 mm Hg. absolute and in the presence of a rapidly boiling liquid.

10 Claims, No Drawings

TERTIARY ALKYLATION UTILIZING AN ADMIXTURE OF OLEFINS AND TERTIARY ALKYL CHLORIDES

CROSS-REFERENCE TO RELATED APPLICATION

The subject matter of the present invention is related to that described in my copending application, Ser. No. 101,921, filed on Dec. 28, 1970, and entitled "Selective Tertiary Alkylation of Aromatic Hydrocarbons," the disclosure of which is incorporated herein by reference.

BACKGROUND OF THE INVENTION

1. Field of the Invention

This invention relates to the Friedel-Crafts catalyzed alkylation of benzene or naphthalene to produce a tertiary alkyl substituent thereon. The reaction is carried out with an admixture of tertiary alkyl chlorides and the internal isoolefins from which the tertiary alkyl chloride is derived.

2. Description of the Prior Art

Alkyl benzenes have been recognized as desirable compounds for various uses. There is much prior art relating to the production of alkyl benzenes generally, and some of the prior art relates to the production of alkyl benzenes containing small tertiary alkyl groups (such as t-butyl benzene). However, when utilizing a bulkier tertiary alkyl group, in order to obtain a heavier oil for different uses, it has been found that it is very difficult to obtain a preferential tertiary alkylation reaction. As described in my copending application referred to above, the reaction of tertiary alkyl chlorides with aromatics such as benzene yields hydrochloric acid which builds up in concentration within the liquid phase and, after a certain level has been reached, the HCl promotes isomerization of the tertiary alkyl chloride into a secondary alkyl chloride which then reacts with benzene, producing the less desirable secondary alkylated product. The secondary alkylated product, unlike the tertiary alkylated product, possesses a vulnerable hydrogen atom on the alkyl carbon attached to the benzene ring. This vulnerable hydrogen atom causes reactions leading to the formation of sludge and other undesirable degradation when the oil is used under conditions of thermal or oxidative load.

DISCUSSION OF THE PRESENT INVENTION

Aromatic nuclei having primary or secondary alkyl substituents are subject to thermal or oxidative degradation because they possess at least one hydrogen atom on the alkyl carbon atom which is attached to the aromatic ring. This hydrogen atom is vulnerable and, under conditions experienced in lubricating or hydraulic oil service, suffer thermal or oxidative degradation leading to the formation of sludge and free acidity. While it is desirable to provide a tertiary alkyl substituent of sufficient size to provide the desired physical properties to the resultant compound, it has been found to be difficult to carry out a reaction which yields the tertiary substituent as a selective product. As disclosed in my copending application, Ser. No. 101,921, referred to above, selective tertiary alkylation can be accomplished by carrying out the reaction under a vacuum and in the presence of a boiling liquid, so as to remove the evolved HCl from the reaction zone rapidly enough to prevent its concentration in the liquid phase from exceeding the acceptable maximum. It has also been found that the selective alkylation reaction required the use of the tertiary alkyl halide and not a tertiary olefin alone. Surprisingly, and according to the present invention, an admixture of tertiary olefins with the tertiary alkyl halide derived therefrom can be used successfully in the selective tertiary alkylation of benzene. It is believed that, under the reaction conditions employed in the alkylation reaction, the evolved hydrogen halide reacts in situ with the isoolefin which is present to form additional tertiary alkyl halide, which is then utilized in the selective alkylation reaction. The olefin is thus operative to help reduce the concentration of free hydrogen halide in the liquid phase.

Since the desired characteristics of the oil are dependent on the type of tertiary alkyl substituent which is employed, the isoolefins which are used will be those internal olefins which, upon reaction with hydrogen halide, yield the desired tertiary alkyl halide.

THE PROCESS

The alkylation process is more specifically described in my copending application above referred to, the disclosure thereof being incorporated hereinto by reference. In general, it relates to the discovery that, by utilizing a vacuum and a boiling liquid in the alkylation reaction zone, selective tertiary alkylation of aromatic hydrocarbons can be accomplished. It has been found that, by using the combination of a substantially subatmospheric pressure and a boiling liquid, the hydrogen halide which is evolved from the alkylation reaction is rapidly swept from the liquid phase into the vapor phase above the reaction mass and is removed from the reaction zone before a substantial concentration of hydrogen halide can build up in the liquid reaction mass. The hydrogen halide concentration in the liquid reaction mass is maintained below a concentration level which varies according to the catalyst employed, the tertiary alkyl halide, and the aromatic nucleus. The catalyst is the most important variable: for benzene alkylation, the hydrogen halide concentration must be kept below 0.02 mol fraction if $FeCl_3$ is the catalyst, and below 0.005 if $AlCl_3$ is the catalyst. The mol fraction is calculated on the basis of the liquid reaction mass as disclosed in the aforesaid copending application.

Reaction temperatures are chosen to allow the reaction of the bulky tertiary alkyl halide with the aromatic nucleus. Inasmuch as the tertiary alkyl halide may contain from seven to 44 carbon atoms, the reaction takes place slowly at extremely low temperatures. Therefore, the reaction is carried out at a temperature from about $-20°$ C. to about $30°$ C., preferably from $15°-20°$ C. The pressure is maintained at a suitably low level, in order to establish boiling conditions within the liquid mass. The pressure therefore will be coordinated with the temperature of the liquid which is to boil. Suitably the pressure will range from 5 mm Hg. to 400 mm Hg. absolute, preferably from 5 to 150 mm Hg. absolute. Where benzene is used as the aromatic nucleus, and is itself to supply the boiling liquid, the pressure will preferably be about 20-40 mm Hg. absolute, with a temperature range from $15°-20°$ C. being preferred.

The reaction is carried out in the presence of a Friedel-Crafts catalyst such as aluminum chloride or ferric chloride. The catalyst may be maintained in solution in the alkyl chloride, may be maintained as a slurry phase solid, or as a fixed or fluidized bed, all of which is known to the art. Preferably, the amount of catalyst to be used when it is in solution will range from about 0.005 to 0.1 mol/mol of mixed tertiary alkyl chloride and olefin of structures

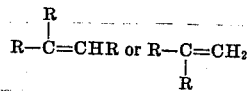

originally charged to the reaction zone.

The residence time of the aromatic hydrocarbon within the reaction zone may range from 5 to 500 minutes. A shorter reaction time will be employed, along with an excess of benzene, where a monoalkylation reaction is desired. Contrarily, a longer reaction time and more alkylating agent will be employed where dialkylation is to be emphasized.

ALKYLATING AGENT

The alkylating agent of the present invention is an admixture of tertiary alkyl chlorides with the internal isoolefins having the structures of

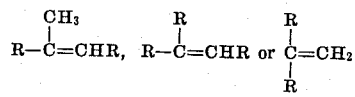

from whence the chloride is derived. Thus, suitable tertiary alkyl chlorides (and isoolefin) may contain from seven to 44 carbon atoms, preferably from seven to 34 carbon atoms. Suitable tertiary alkyl halides, identified as chlorides, are 10-chloro-10-methyl-eicosane, 6-chloro-6-methylhexadecane, 2-chloro-2-methylhexane, 2-chloro-2-methylheptane, 2-chloro-2-methyloctane, 2, chloro-2-methylnonane, 2-chloro-2-methyldecane, 2-chloro-2-methylundecane, 2-chloro-2-mehtyldodecane, 2-chloro-2-n-octyldecane, etc.

The synthetic lubricant product will have a better combination of physical properties (such as pour point, viscosity and viscosity index) if the alkylating agents are a mixture of different carbon numbers; e.g., for an average carbon number of about $C_{20}$, the t-alkyl chlorides and t-olefins may have varying carbon numbers such as $C_{14}$ through $C_{24}$. Alternatively, a single t-alkyl chloride may be employed with a mixture of tertiary olefins.

The tertiary olefins will exhibit structures represented by the formulas:

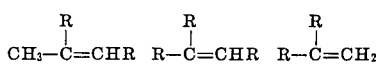

where R represents alkyl substituents, preferably straight chained. As aforesaid, the total number of carbon atoms in the olefin will be set by the number desired in the t-alkyl chloride, and will range from seven to 40, preferably seven to 34, carbon atoms.

The corresponding internal isoolefins may be identical in structure to the tertiary alkyl chloride, having instead of the chlorine atom an unsaturated linkage alpha to the carbon atom from which the branched chain extends. For example, 10-methyleicosene-9 and 10-methyleicosene-10 and 2-nonyldodecene-1 correspond to 10-chloro-10-methyleicosane, and 6-methylhexadecene-5, 6-methylhexadecene-6 and 2-pentyldodecene-1 correspond to 6-chloro-6-methylhexadecane. The relative proportions between the isomeric olefins will depend upon the manner in which they were obtained, and insofar as the present invention is concerned, will be immaterial.

The ratio of the admixture of isoolefins to the tertiary alkyl halide is, however, important in that it must be maintained at a level where the reaction between evolved hydrogen halide and the isoolefin can provide enough tertiary alkyl carbonium ions to replace those being reacted with the aromatic nucleus. Therefore, the mol ratio of isoolefins to tertiary alkyl halide should be from about 1:10 to about 5:1, preferably within the range from 1:3 to about 2:1.

The admixture of isoolefins and tertiary alkyl halide provides the alkylating agent. For monoalkyl products, the mol ratio of alkylating agent to benzene or naphthalene should range from about 1:40 to about 5:1, preferably from 1:40 to about 1:1; for increased amounts of dialkyl products the ratio should be from about 1:2 to 15:1.

AROMATIC NUCLEUS

The aromatic nucleus for use in the present process is benzene or naphthalene and their lower alkyl derivatives such as toluene, xylenes, ethylbenzene and admixtures thereof. Preferably, substantially pure benzene, commonly called nitration grade, will be used, an example of which is shown below in Table I.

TABLE I

| Benzene Feedstock Inspection Data | |
|---|---|
| Sp. gravity 60/60° F. | 0.884 |
| Distillation Range, °C. | 1° including the temperature of 80.1° C. |
| Acidity | No free acid |
| Acid wash color, max. | 2 |
| Sulfur compounds | Free of hydrogen sulfide, $SO_2$ and thiophene |
| Copper Corrosion | No iridescence or gray or black discoloration |
| Color | < 0.003 g. potassium dichromate in 1 liter $H_2O$ |
| Solidifying Point (dry basis °C), min. | 5° C. |
| Flash, Tag Open Cup, °F. | 40 |
| Water or suspended matter | Absent |

However, commercial benzene need not be completely pure, but may contain small amounts of other compounds, especially other aromatics in small proportions.

PRODUCTS

The tertiary alkylated benzenes which are obtained from the process of the present invention may be used as lubricants, greases, hydraulic oils, etc., depending upon the viscosity and other physical properties of the product. Generally, the hydraulic oils and lubricating oils will be monoalkylated products whereas the dialkylated products will be used as the base stock for grease formulations. As an example of a hydraulic oil produced by the present invention, see Table II below.

TABLE II

Aviation Hydraulic Fluid*[2]

| Synthetic oil | $C_5H_{11}-\overset{CH_3}{\underset{|}{C}}-C_{10}H_{21}$ | $C_9H_{19}-\overset{CH_3}{\underset{|}{C}}-C_{10}H_{21}$ |
|---|---|---|
| | (Example 2) | (Example 1) |
| Viscosity, cs. at 100° F | 13.04 | 18.99 |
| Viscosity index | 37 | 97 |
| Pour point, ° F | −55 | −60 |
| Flash point, ° F | 420 | 470 |
| Oxidation/corrosion stability [1] | Pass | Pass |
| Thermal/corrosion stability | Pass | Pass |

*Blended as follows: Synthetic oil, 98 wt. percent; Tricresyl phosphate, 1 wt. percent; Antioxidant (ethyl 702), 1 wt. percent.
[1] As determined by MIL-H-27601A.
[2] The finished blended oil may also contain VI improver and pour depressants as desired.

By reference to Table II it can be seen that the products of Examples 1 and 2 have provided satisfactory aviation hydraulic fluids. Since they are substantially pure compounds, the properties are controllable, and since the substituents are tertiary alkyl groups, the compounds do not suffer undue thermal and oxidative degradation under service and those desirable properties can be maintained.

In order to illustrate the present invention, the following examples are given:

EXAMPLE 1

Benzene was alkylated with a mixture of tri-substituted ethylene type $C_{21}$ isoolefins and the corresponding tertiary alkyl chlorides. The olefin mixture was made up of 34 mol percent of 10-methyleicosene-9, 51 mol percent of 10-methyleicosene-10, and 15 mol percent of 2-nonyldodecene-1:

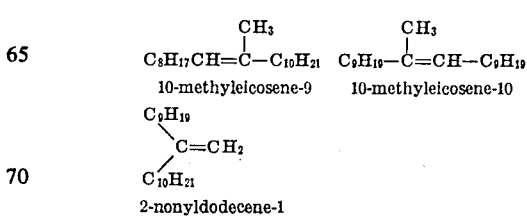

The tertiary alkyl chloride is derived from the mixture of three olefins, and has the structure:

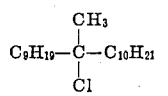

10-chloro-, 10-methyleicosane

An admixture of 239 g of the olefin mixture and 258 g of the alkyl chloride plus 293 g of benzene was added to 293 g of benzene and 5 g of AlCl$_3$ over a period of 60 minutes while stirring the liquid reaction mass. The temperature varied from 5° C. to 15° C. during the reaction period. A vacuum was maintained, the pressure during the reaction being about 60 mm Hg absolute. After termination of the reaction the product was recovered and found to have the following analysis:

tertiary alkyl benzene 64
secondary alkyl benzene 36
primary alkyl benzene 0

The product was compounded to produce an Aviation Hydraulic Fluid having the characteristics shown in Table II above.

EXAMPLE 2

Benzene was alkylated with a mixture of internal C$_{17}$ isoolefins and the corresponding tertiary alkyl chloride. The olefin mixture was made up of 32 volume percent of 6-methylhexadecene-5 and 68 volume percent of 6-methylhexadecene-6:

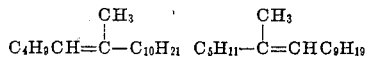

The tertiary alkyl chloride is derived from both of the above-mentioned olefins and has the structure:

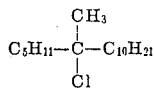

An admixture of 139 g of the olefin mixture, 274 g. of the alkyl chloride and 293 g of benzene was added as the alkylation agent to 293 g of benzene and 5 g of aluminum chloride over a period of 60 minutes while stirring the liquid reaction mass. The temperature varied from 5° C. to 15° C. during the reaction period. A vacuum was maintained, the pressure during the reaction being about 60 mm Hg absolute. After termination of the reaction, the product was recovered and found to have the following analysis:

tertiary alkyl benzene 69
secondary alkyl benzene 31
primary alkyl benzene 0

The product was compounded to produce an aviation hydraulic fluid having the characteristics shown in Table II above.

Having disclosed my invention, what is to be covered by Letters Patent should be determined from the following claims.

I claim:

1. A process of selectively tertiary alkylating an aromatic hydrocarbon chosen from the group consisting of benzene and naphthalene and the lower alkyl derivatives thereof which comprises:
   in a reaction zone maintained at a pressure from about 5 mm Hg absolute to about 400 mm Hg absolute and a temperature from about −20° C. to about 30° C.
   and in contact with a Friedel-Crafts catalyst which is present in catalytically effective amounts,
   reacting said aromatic hydrocarbon with an admixture of isomeric isoolefins, one or more having the structure

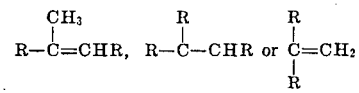

where R is an alkyl group, and the tertiary alkyl chloride derived therefrom,
the mol ratio of isomeric olefins/tertiary alkyl chloride being from about 0.1:1.0 to about 5:1 and the benzene/alkylating agent mol ratio being from about 40:1 to 1:15,
while said benzene is in a rapidly boiling state.

2. A process in accordance with claim 1 wherein the isomeric olefins/tertiary-alkyl chloride mol ratio is from about 1:3 to about 2:1.

3. A process in accordance with claim 1 wherein the described isomeric olefins have C numbers from C$_{10}$ to C$_{34}$ and the t-alkyl chloride has an equal or unequal carbon number.

4. A process in accordance with claim 3 wherein the aromatic hydrocarbon is benzene and the ratio of components range as follows:
   olefin/tertiary-alkyl chloride is from 1:3 to 2:1 and
   benzene/alkylating agent is from 20:1 to 1:8.

5. A process in accordance with claim 1 wherein the aromatic hydrocarbon is naphthalene or a tertiary alkyl substituted naphthalene.

6. A process in accordance with claim 5 wherein the described isomeric olefins/tertiary-alkyl chloride mol ratio is from about 1:3 to 2:1.

7. A process in accordance with claim 1 wherein the described isomeric olefins are of equal or different carbon numbers from the tertiary-alkyl chlorides and both are in the range of seven to 44 carbon numbers.

8. A process in accordance with claim 7 wherein the aromatic hydrocarbon is benzene and the mol ratios of the isomeric olefins/tertiary-alkyl chloride is from 1:3 to 2:1 and benzene/alkylating agent is from 20:1 to 1:8.

9. A process in accordance with claim 7 wherein the aromatic is naphthalene or a tertiary-alkyl substituted naphthalene.

10. A process in accordance with claim 9 wherein the described isomeric olefins/tertiary-alkyl chloride mol ratio is from about 1:3 to 2:1.

* * * * *